United States Patent [19]

Chikatsune et al.

[11] Patent Number: 5,119,600
[45] Date of Patent: Jun. 9, 1992

[54] DEBURRING APPARATUS

[75] Inventors: Hiroshi Chikatsune; Toshihisa Taue; Masaichi Nakanishi; Toyohiro Nagai; Kazuhiro Masuno; Ryuma Takeda, all of Aichi, Japan

[73] Assignee: Kawasaki Steel Corporation, Kobe, Japan

[21] Appl. No.: 445,668

[22] PCT Filed: Apr. 7, 1989

[86] PCT No.: PCT/JP89/00378
§ 371 Date: Dec. 5, 1989
§ 102(e) Date: Dec. 5, 1989

[87] PCT Pub. No.: WO89/09681
PCT Pub. Date: Oct. 19, 1989

[30] Foreign Application Priority Data
Apr. 8, 1988 [JP] Japan ............... 63-46848[U]
Apr. 8, 1988 [JP] Japan ............... 63-84998

[51] Int. Cl.⁵ .......................................... B24B 49/00
[52] U.S. Cl. ............................. 51/165.87; 51/165.71; 51/165.74; 51/100 R; 51/289 R
[58] Field of Search .......... 51/165.71, 165.74–165.78, 51/165.87, 289 R, 50, 100 R

[56] References Cited
U.S. PATENT DOCUMENTS

| | | | |
|---|---|---|---|
| 4,221,514 | 9/1980 | Pavlovsky | 51/101 R |
| 4,428,162 | 1/1984 | Feldt et al. | 51/165.77 |
| 4,471,580 | 9/1984 | Robillard | 51/165.87 |
| 4,528,743 | 7/1985 | Bleich | 51/168 |
| 4,559,684 | 12/1985 | Pryor | 51/165.72 |
| 4,777,769 | 10/1988 | McLaughlin et al. | 51/165.71 |
| 4,864,777 | 9/1989 | McLaughlin et al. | 51/165.71 |

Primary Examiner—M. Rachuba
Attorney, Agent, or Firm—Dvorak and Traub

[57] ABSTRACT

A deburring robot acts in accordance with the size of the pipe, the upset shape, and information about the position of burrs. A deburring grinder removes burrs with a whetstone along the surface of the upset pipe as sensed by a copying claw. Wear on the whetstone is compensated after a predetermined amount of use. When the whetstone reaches its wear limit, the overall body of the deburring grinder or only the whetstone is exchanged.

4 Claims, 11 Drawing Sheets

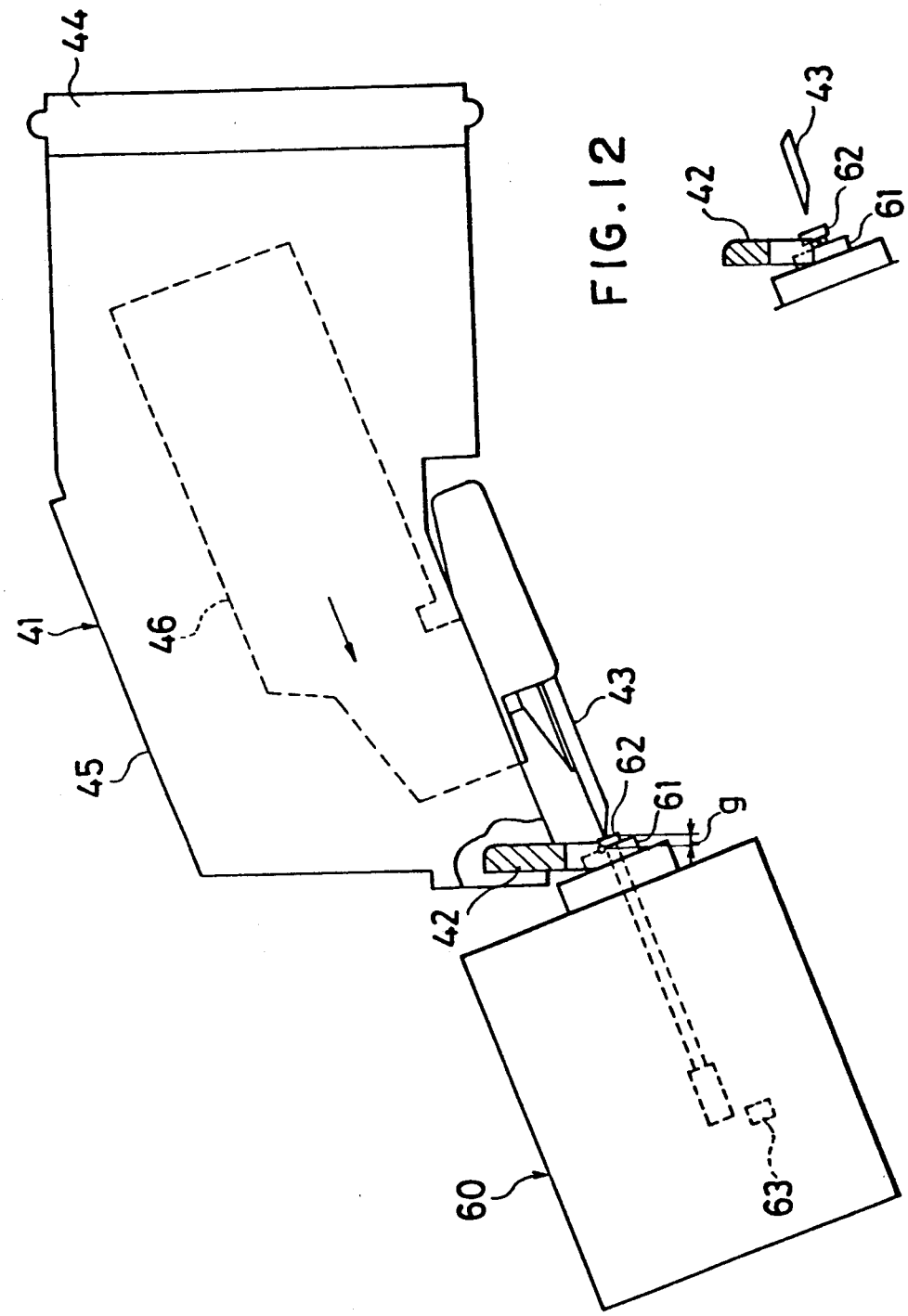

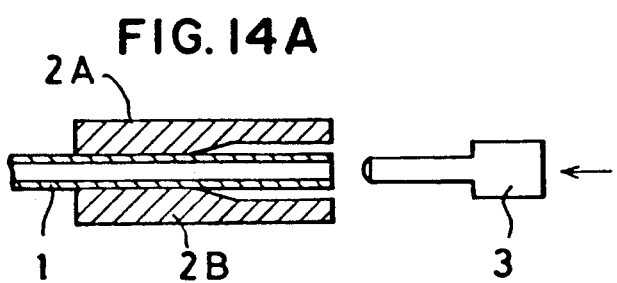
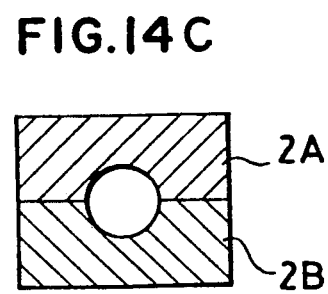
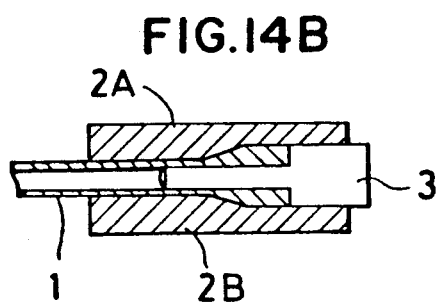
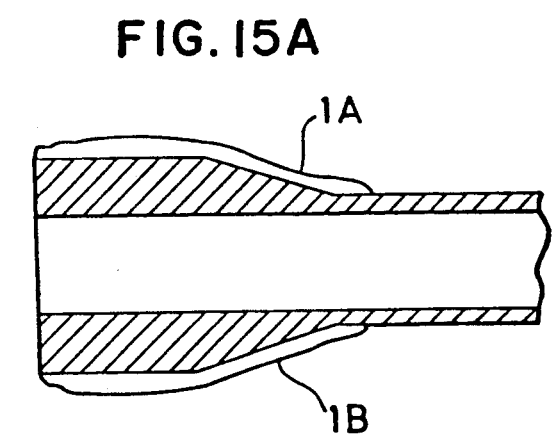
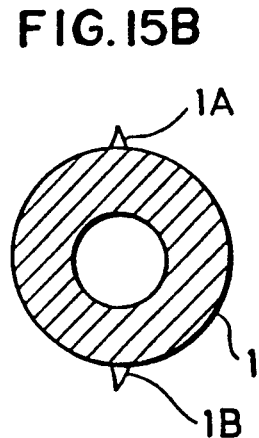

DEBURRING APPARATUS

BACKGROUND OF THE INVENTION

1. Field of the Invention

The present invention relates to a deburring apparatus. and, more particularly, to a deburring apparatus capable of automatically removing burrs formed on the surface of, for example, upset steel pipes for oil wells.

2. Description of the Related Art

Since oil drilling takes place under coarse conditions, the steel drilling pipes require excellent strength in the main pipe sections thereof as well as in the threaded coupling portions for joining the steel pipe sections.

The strength of the above-described threaded joining portion may become insufficient since the thickness of the pipe wall is inevitably reduced. Therefore, if more strength is necessary, the thickness of the wall of the end portion of a pipe which is threaded to make it suitable for joining is increased by upset forging work before conducting the thread forming work.

Upset forging is, as shown in FIGS. 14(A) and 14(B), a kind of machining for increasing the thickness of the wall of the end portion of a steel pipe 1 by forcibly inserting a punch 3 in the direction designated by an arrow into the end portion of the steel pipe 1 which is positioned between an upper half mold 2A and a lower half mold 2B.

However, the molds 2A and 2B for use in the upset forging are so chamfered at the joints thereof as shown in FIG. 14(C) as to protect the outer surface of the steel pipe 1 from being bitten by the joints of the mold due to plastic deformation during the forging.

Therefore, burrs 1A and 1B are formed in two places in the circumferential direction of the steel pipe 1 as shown in FIGS. 15(A) and 15(B) during the upset forging, the burrs 1A and 1B being formed in the direction along the axis of the steel pipe 1.

That is, burrs are inevitably formed on the outer surface of the upset pipes or cast products at the position corresponding to the portions at which the joints of the half upset molds or casting dies are coupled to each other. Since such burrs deteriorate the quality of the machinings and products from the ensuing processes, they must be removed by hand work with, for example, a rotary whetstone. Since deburring work with a rotary whetstone requires heavy manual labor and the problem of dust arises, it is preferable that such burrs be removed without direct human labor.

(1) However, in the case where the deburring work with the rotary whetstone is simply automated, a complicated or irregularly changed shape of the material to be machined or nonuniform shape of the burrs will cause the material to be bitten by the whetstone or cause failure to remove all the burrs.

An object of the present invention is to provide a deburring robot capable of reliably removing burrs formed on the surface of the workpiece even when the surface has a complicated or an irregularly changed shape or when the shape of the burrs are nonuniform.

(2) When the deburring work with a rotary whetstone is intended to be automated, it might be considered of providing a copying claw capable of copying the surface of the workpiece and of positioning the whetstone with a specified positional relationship kept with the copying nail. This leads to the fact that the whetstone can be so relatively moved as to trace the surface of the workpiece by virtue of the action of the copying nail. As a result, the burrs can be thoroughly removed without a fear of biting the workpieces.

However, with the structure in which a copying nail of the type described above is used, a whetstone is worn in accordance with the time elapsed, causing its positional relationship with the copying nail to be inevitably changed. Therefore, even if the copying nail reliably, performs its roll of copying the surface of the workpiece, a perfect deburring effect by the whetstone cannot be expected.

Another object of the present invention is to improve accuracy in the deburring effect by suitably modifying the positional relationship between the copying nail and the whetstone when the whetstone is worn.

(3) In the case where the deburring work with a rotary whetstone is intended to be automated, a multiplicity of whetstones must be frequently used when the whetstone is completely worn or in order to correspond to variations in workpieces. Therefore, it is necessary to reliably and readily renew the worn whetstone with no fear of deterioration in the operation rate.

A further object of the present invention is to readily renew the whetstone with no fear of deterioration in the operation rate.

(4) If the burrs are not removed after the upset forging, the following problems arise:

① In the case where the upset forging work contains a multiplicity of manufacturing processes to satisfy the designed increase ratio of the thickness of the workpiece, burrs formed in the first process bite the forged portion in the next process, causing a problem of quality to arise.

② The retained burrs deteriorate the accuracy of the threads and the life of the cutter during the threading process.

③ The interference of the burrs with the coupling for connecting steel pipes prevents a suitable clamping.

④ The burrs deteriorate the appearance and therefore the quarity of the product.

Therefore, in order to remove the burrs, an apparatus capable of removing the burrs is necessary. However, the unmanned deburring work causes the following problems:

① Since there are variations in the sizes of the pipes and in the upset shapes, the automated deburring apparatus must quickly and reliably correspond to the variable workpieces in order to reliably detect the positions of the burrs and remove the burrs.

② The deburring apparatus must reliably correspond to variations in the upset shapes whith are due to the changes in the size of the pipe. For example, the upset length is varied by changes in the wall thickness of the pipe as shown in FIG. 16.

③ The deburring apparatus must also reliably correspond to variations in the shapes of the burrs which are due to changes in the size of pipe. For example, if the upset length is changed due to a change in the wall thickness of the pipe, the upsetting force becomes nonuniform as shown in FIG. 17. This leads to the fact that the dimensions of the gap formed in the aperture in the mold change, causing the shape of the burrs to the vary.

A still further object of the present invention is to reliably detect the positions of the burrs and to remove the thus detected burrs even if the upset shape or the shape of the burrs are varied due to changes in the size of the pipe, the reliably detecting the positions of the burrs and reliably removing the same corresponding to variations in sizes of the pipes and upset shapes.

SUMMARY OF THE INVENTION

Accordingly, a first aspect of the present invention shown in claim 1 lies in a deburring apparatus comprising: a deburring robot having a deburring grinder which is capable of removing burrs on a workpiece by a rotary whetstone therein along the shape of the workpiece; a whetstone wear compensating device capable of compensating an amount of wear of the whetstone of the deburring grinder, and a whetstone renewing device capable of exchanging the deburring grinder.

A second aspect of the present invention shown in claim 1 lies in a fact that the deburring grinder having the deburring robot comprises a stationary frame secured to a movable arm of the deburring robot, a copying frame capable of supporting the whetstone and so coupled to the stationary frame as to be movable in the direction of grinding by the whetstone, a copying claw provided for the copying frame and capable of copying the surface of the workpiece, and an equalizing device disposed between the stationary frame and the copying frame and capable of pressing the copying frame to the stationary frame in the direction in which the whetstone grinds the workpiece.

A third aspect of the present invention shown in claim 2 lies in a fact that:

(a) The deburring grinder included by the deburring robot comprises a stationary frame, a copying frame so coupled to the stationary frame as to be movable in the direction in which the whetstone grinds the workpiece and having a copying claw capable of copying the shape of the workpiece, a whetstone frame so disposed to the copying frame as to be slidable in the direction in which the whetstone wears and having the whetstone; and a clamping device disposed between the copying frame and the whetstone frame and capable of clamping the whetstone frame to the copying frame.

(b) A whetstone wear compensating device comprises a base block with which the copying claw of the copying frame is brought into contact, a detection element with which the whetstone of the whetstone frame is brought into contact, and a detection sensor capable of detecting a fact that the detection element is positioned at a predetermined position with respect to the base block.

(c) A wear compensating system is formed in which the whetstone frame is arranged to be slidable owning to its dead weight with respect to the copying frame under condition that the copying claw of the copying frame is brought into contact with the base block. Furthermore, the whetstone of the whetstone frame is brought into contact with the detection element. Under conditions that the fact that the detection element is positioned at a specified position with respect to the base block is detected by the detection sensor, the whetstone which is positioned in contact with the detection element is positioned at a predetermined position with respect to the copying claw which is positioned in contact with the base block.

The fourth aspect of the present invention shown in claim 3 lies in the fact that the whetstone renewing device comprises a chucking device capable of attaching and detaching the deburring grinder to a movable arm of the deburring robot, the chucking device comprising a cylindrical guide pin fitted within a positioning hole formed in the stationary frame of the grinder and as well arranged to serve as an air supply passage through which air can be supplied to the grinder, and a chucking claw which can be engaged to a faucet joint formed in the stationary frame of the grinder by an elastic member and can be disengaged by an air cylinder device.

A fifth aspect of the present invention shown in claim 4 lies in a deburring apparatus capable of removing burrs on a surface of an upset pipe whose thickness has been increased by upset forging with a punch inserted into an end portion of the upset pipe positioned in a pair of half molds, the deburring apparatus comprising: a burr position detection device capable of detecting the position of burrs on the surface of the upset pipe, a deburring robot including a deburring grinder having a copying claw capable of copying the surface of the upset pipe and a whetstone disposed at a predetermined position with respect to the copying claw, a whetstone wear compensating device capable of adjusting the position of the whetstone of the deburring grinder used in the deburring robot with respect to the copying claw and compensating amount of wear of the whetstone, a whetstone renewing device capable of exchanging the overall body of the deburring grinder or only the whetstone of it used in the deburring robot, a main control unit capable of controlling the above-described devices and the robot a memory device, and an I/O device. The main control unit controls the operation of the deburring robot, its deburring grinder, and the whetstone wear compensating device under conditions that (a) the main control unit removed the burrs on the surface of the upset pipe by controlling the operation of the deburring robot and its deburring grinder in accordance with information about the position of the burrs detected by the burr position detection device (b) the whetstone of the deburring grinder reached a predetermined moment of usage of the whetstone Furthermore, the main control unit exchanges the overall body of the deburring grinder or only the its whetstone by controlling the deburring robot, its deburring grinder, and the whetstone renewing device on the conditions that (c) the whetstone of the deburring grinder used in the deburring robot reaches its wear limit.

According to the invention shown in claim 1, burrs formed on the surface of the workpiece can be always reliably removed without manual labor.

According to the invention shown in claim 1, the whetstone can be caused to correspond to the complicate outer surface of the workpiece, irregular outer surface, or nonuniform shape of burrs so that the workpiece can be protected from being bitten or failure to remove burrs can be overcome. That is, even if the shape of the workpiece is complicated or irregularly changed or the shape of burrs are nonuniform, burrs formed on the surface of the workpiece can be reliably removed.

According to the invention shown in claim 2, when the whetstone has been worn due to the time elasped, the copying claw of the copying frame is brought into contact with the base block and the whetstone frame released from the clamping by the clamping by the clamping device is readily slid with respect to the copying frame owning to its dead weight, and the whetstone supported by the whetstone frame is brought into contact with the detection element so that the positional relationship between the whetstone and the copying claw can be modified to the predetermined relationship.

Therefore, when the copying claw copies the surface of the workpiece via the copying claw, the whetstone can relatively move along the surface of the workpiece via the copying claw so that deburring can be reliably conducted.

According to the present invention shown in claim 3 since the chucking device is provided with a guide pin, accuracy in positioning can be improved. Furthermore, since the guide pin is also used as the air supplying passage, the deburring grinder and power source can be connected to the same. Therefore, when the whetstone reaches its wear limit, or when a new whetstone is used to correspond to the type or change in the workpiece, the deburring robot used to correspond to a variety of whetstone are frequently used can exhibits a capability of readily and reliably renewing the whetstone without deterioration in the operation rate.

According to the present invention shown in claim 4,

① The positions of burrs on the surface of the upset pipe can be detected by the burr position detection device.

② The deburring robot acts in accordance with the size of the pipe, the upset shape, and information about the position of burrs or the like detected as shown in ①, as a result, the deburring grinder removes burrs with the whetstone along the surface of the upset pipe by an action of the copying claw.

③ Wear of the whetstone of the deburring grinder is compensated at a predetermined moment of use.

④ When the whetstone of the deburring grinder reaches its wear limit, the overall body of the deburring grinder or only the whetstone is exchanged.

As a result, the present invention shown in claim 4 gives the following effects:

① Since the main control unit controls the burr position detection device, deburring robot, the whetstone wear compensating device, and the whetstone renewing device, a variety of workpiece can be quickly and reliably machined and the positions of burrs thereon can be reliably detected and reliably removed ② At this time, since the burr position detection device is provided, change in the upset shape due to change in the size of the pipe and nonuniform shape of burrs can be overcome.

③ Since the whetstone wear compensating device and the whetstone renewing device are provided, the whetstone of the deburring grinder is always positioned at a predetermined position with respect to the copying claw. As a result, the material of the pipe can be protected from being bitten and entire surface of the pipe can be deburred without failure.

Therefore, according to the present invention shown in claim 4, the position of burrs on the surface of the pipes of varying sizes and the upset shapes can be reliably detected and burrs thus detected can be reliably removed even if the upset shape or the shape of the burrs vary due to changes in the size of the pipe.

BRIEF DESCRIPTION OF THE DRAWINGS

FIG. 11 is a side elevational view which illustrates a whetstone wear compensating device;

FIG. 12 is a schematic view which illustrates a compensating operation performed by the whetstone wear compensating device;

FIGS. 14a-c are schematic views which illustrate molds and a punch for use in the upset forging work;

FIG. 15a-b are schematic views which illustrate the state of generation of burrs on the surface of the upset pipe;

DESCRIPTION OF THE PREFERRED EMBODIMENTS

An embodiment of the present invention will now be described with reference to the accompanying drawings.

Figure 1:
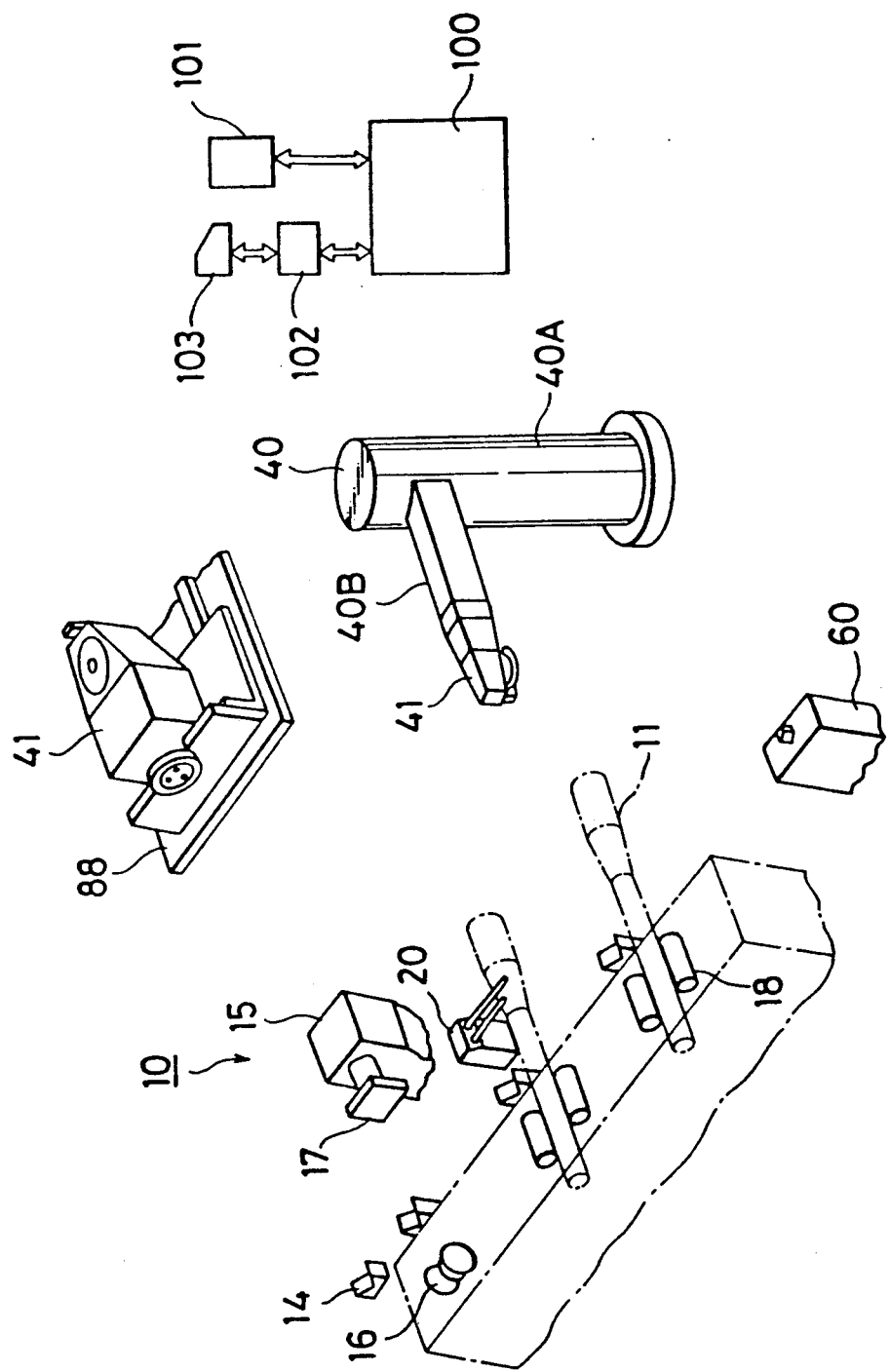
FIG. 1 is a schematic view which illustrates the overall structure of an embodiment of a deburring apparatus according to the present invention.

A pipe 11 to be subjected to a deburring work by the deburring apparatus 10 shown in FIG. 1 is upset-forged at its end portion which has been disposed between a pair of half molds in an upsetter similar to that shown in FIG. 14. As a result, a thichness-increased straight portion 12 and a thickness-increased tapered portion 13 as shown in FIG. 15 are created. At the time of conducting the upset forging, burrs 12A and 13A are, as described above, formed in the wall-increased straight portion 12 and the wall-increased tapered portion 13. As shown in FIG. 7, the burrs 12A in the wall-increased straight portion 12 of the pipe 11 are removed, while the burrs 13A are left from the removal in the wall-increased tapered portion 13 of the same. The pipe 11 is then introduced into a burr position detection device 20 shown in FIG. 6.

The deburring device 10 shown in FIG. 1 comprises: walking beam device 14, a pipe-end aligning device 15, a burr position detection device 20, a deburring robot 40, a whetstone wear compensating device 60, a whetstone renewing device 80, and a main control unit 100.

The pipe-end aligning device 15 comprises an aligning roller 16 and an aligning stopper 17 and capable of aligning the end portion of the pipe 11 at a predetermined position by pressing the end surface of the pipe 11 to the stopper 17 by the rotation of the alining roller 16 thereof.

The burr position detection device 20 comprises as described later and capable of detecting the position ($a0$) of the burrs 13A left in the circumferential direction of the tapered portion 13 of the pipe 11 and the position (l0) of the start of the tapering (l0) of the tapered portion 13.

The deburring robot 40 comprises as described later and is provided with a deburring grinder 41, the deburring grinder 41 being provided with a copying claw 42 capable of copying the surface of the pipe 11 and a rotary whetstone 43 which is positioned with a constant positional relationship kept with respect to the copying claw 42. The copying claw 42 is in the form of a reversed U-shape so as to hold the burrs 13A. As a result, the copying claw 42 can copy the surface of the pipe 11 in such a manner that the copying claw 42 is not brought into contact with the burrs 13A.

The whetstone wear compensating device 60 comprises as described later and is capable of adjusting the position of the whetstone 43 of the deburring grinder 41 with respect to the copying claw 42 so as to compensate the amount of the wear of the whetstone 43, the deburring grinder 41 being used in the deburring robot 40.

The whetstone renewing device 80 comprises as described later and is capable of exchanging the overall body or only the whetstone 43 of the deburring grinder 41 used in the deburring robot 40.

The main processing unit 100 is so equipped with a memory 101 and an I/O unit 102 as to control the above-described devices 14, 15, 20, 60, 80, and the robot 40 in accordance with a deburring program and an wear compensating program and the like. At this control, the main processing unit 100 is, via the I/O device 102, supplied with an upset schedule (the size of the pipe, the upset shape, and the like) to be then transmitted to a main operation panel 103 or supplied with a result of the detection performed by the burr position detection device 20.

That is, the main control unit 100 performs the following actions:

ⓐ The burrs 13A formed on the upset pipe 11 are removed by way of controlling the operations of the deburring robot 40 and its deburring grinder 41 on the basis of information about the positions of the burrs which has been detected by the burr position device 20.

ⓑ The amount of wear of the whetstone 43 of the deburring grinder 41 is compensated by way of controlling the operation of the deburring robot 40, its deburring grinder 41, and the whetstone wear compensating device 60 when the whetstone 43 of the deburring grinder 41 used in the deburring robot 40 is used to reach a predetermined factor representing the degree of wear due to the usage (for example, the number of the deburred pipes 11)

ⓒ The overall body or only the whetstone 43 of the deburring grinder 41 is exchanged by way of controlling the operation of the deburring robot 40, its deburring grinder 41, and the whetstone renewing device 80 when the whetstone 43 of the deburring grinder 41 used in the deburring robot 40 reaches a predetermined factor representing the wear limit (for example, the wear of the whetstone 43 reaches a degree which cannot be compensated by the whetstone compensating device 60).

With the above-described deburring apparatus 10, the following operations are conducted:

① The positions of burrs on the surface of the upset pipe 11 are detected by the burr position detection device 20.

② The deburring robot 40 operates in correspondence with the size of the main pipe, the upset shape, and information about the positions of the burrs detected by the operation shown in ① so that the burrs 13A are removed by the whetstone 43 of the deburring grinder 41 with the surface of the upset pipe 41 copied by the copying claw 42.

③ Wear of the whetstone 43 of the deburring grinder 41 is compensated in accordance with a predetermined factor representing the degree of wear due to the usage.

④ When the whetstone 43 of the deburring grinder 41 reaches its wear limit, the overall body of only the whetstone of the deburring grinder 41 is exchanged.

As a result, the following effects can be obtained from the use of the above-described deburring apparatus 10:

① Since the main control unit 100 controls the burr position detection device 20, the deburring robot 40, the whetstone wear compensating device 40, and the whetstone renewing device 80, the deburring apparatus 10 can quickly and reliably corresponds to the variations in the workpiece so as to reliably detect the positions of the burrs 13A. Therefore, the burrs 13A can be reliably removed.

② During this, the deburring apparatus 10 can correspond to variations in the upset shape and shape of burrs caused from the variations in the size of the main pipe can be reliably by virtue of the action of the burr position detection device 20.

③ The whetstone 43 of the deburring grinder 41 can be positioned with a constant positional relationship kept with respect to the copying claw 42 by virtue of the action of the whetstone wear compensating device 60 and the whetstone renewing device 80. As a result, the burrs 13A can be completely reliably removed without failure.

Therefore, the deburring apparatus 10 can reliably detect the positions of the burrs 13A and reliably remove them in correspondence with variations in the upset shape or the shape of burrs caused from the variations in the size of the main pipe and in the shape of the upset shape.

Then, the structure of elements of the deburring apparatus 10 is formed: the burr position detection device 20, the deburring robot 40, the whetstone wear compensating device 60, and the whetstone renewing device 80 which are controlled by the main control unit 100 will be described.

Figure 2:
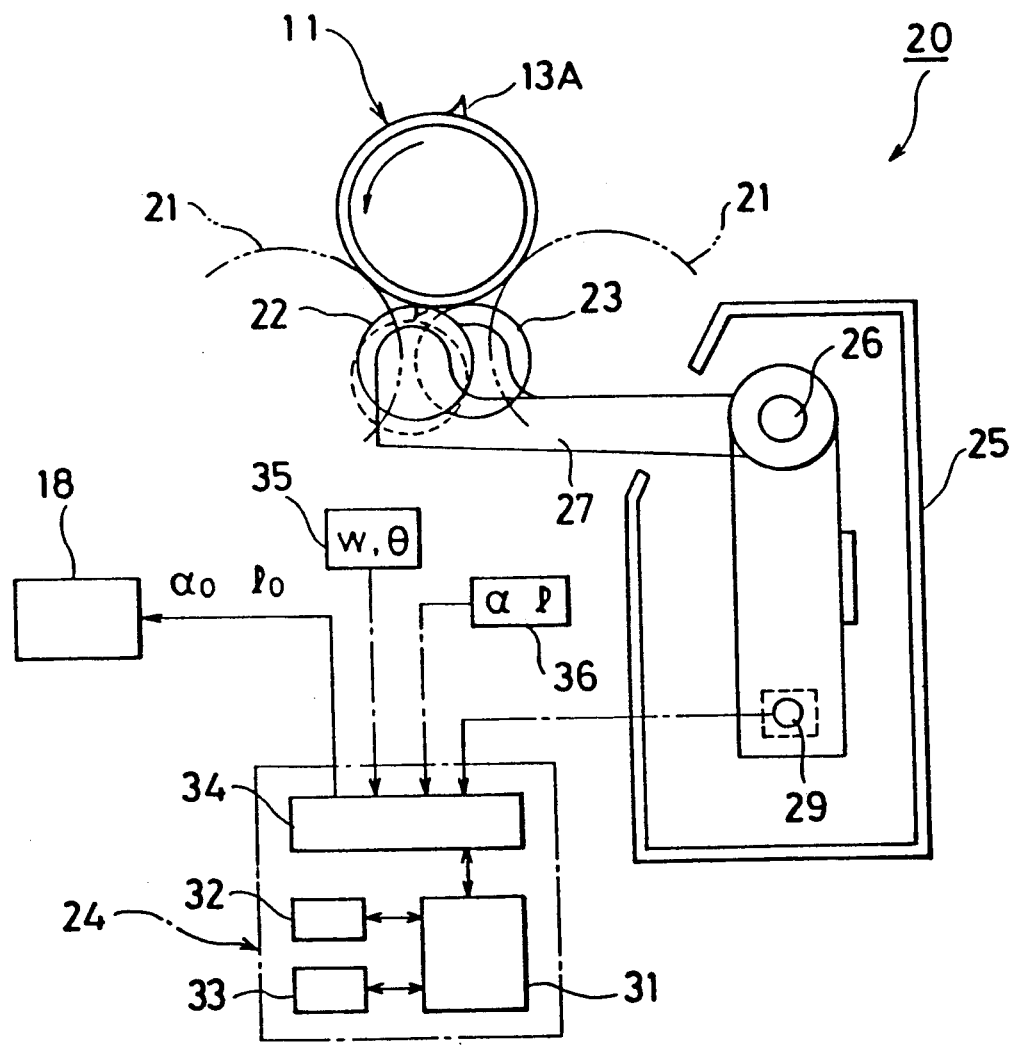
FIG. 2 is a front elevational view which illustrates an essential portion of a burr position detection device.
Figure 3:
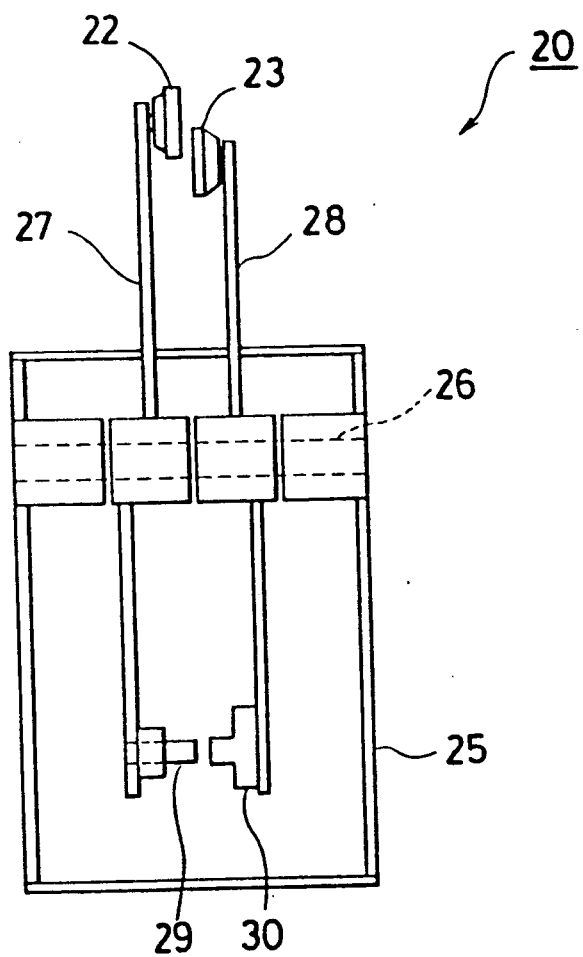
FIG. 3 is a side elevational view of FIG. 2.
Figure 6:
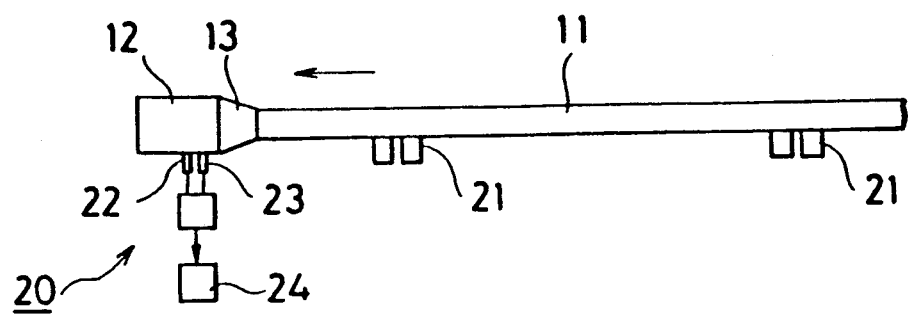
FIG. 6 is a plan view which illustrates the overall structure of the burr position detection device.
Figure 7:
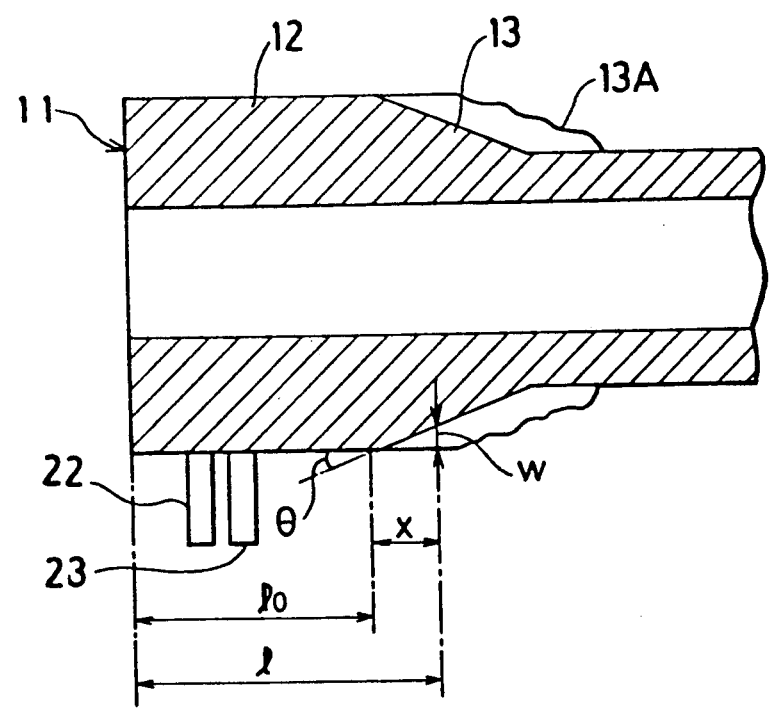
FIG. 7 is a schematic view which illustrates an end of the pipe.

The burr position detection device 20 comprises, as shown in FIGS. 2, 3, and 6, a rotating device 21, a first contact roller (a first contact) 22, a second contact roller (a second contact) 23, and a determination device 24.

The rotating device 21 comprises a pair of skew rollers so as to rotate the pipe 11.

The contact roller 22 and 23 are respectively disposed at an end portion of the corresponding movable levers 27 and 28 which are supported by a support rod 26 disposed to a frame 25, the contact rollers 22 and 23 being brought into contact with the outer surface of the pipe 11 which is skew-rotated by the rotating device 21 so as to move along the shape of the pipe 11. During this movement, the first contact roller 22 and the second contact roller 23 are so brought into contact with the outer surface of the pipe 11 as to deviate from each other. Another end of each of the levers 27 and 28 is provided with a proximity switch 29 and a dog 30.

Figure 8A:
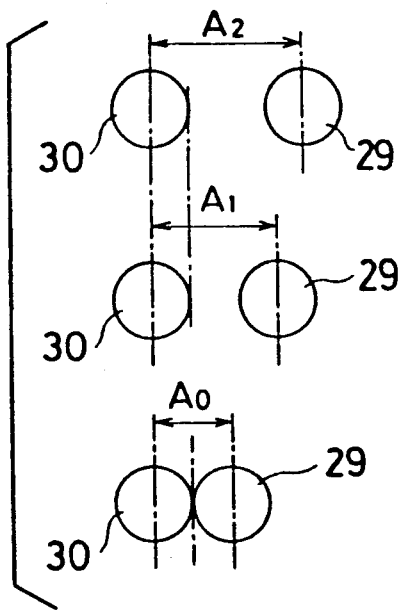
FIGS. 8a-c schematic views which illustrate a relative movement between a first contact and a second contact.

FIG. 8(A) is a view which illustrates change in the positional relationship between the proximity switch 29 and the dog 30 during the forward movement for the contact portions performed by the first contact roller 22 and the second contact roller 23 from the thickness-increased straight portion 12 to the thickness-increased tapered portion 13. When both the first contact roller 22 and the second contact roller 23 are positioned in contact with the thickness-increased straight portion 12, relative distance between the proximity switch 29 and the dog is expressed by A2. When the first contact roller 22 starts its contact with the thickness-increased straight portion 12 and the second contact roller 23 starts its contact with the thickness-increased tapered portion 13, the relative distance between the proximity switch 29 and the dog is reduced to A1. On the other hand, when both the first contact roller 22 and the second contact roller 23 are brought into contact with the thickness-increased tapered portion 13, the relative distance between the proximity switch 29 and the dog 30 is reduced to A0.

Figure 8B:
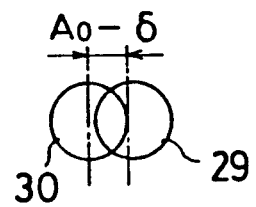

FIG. 8(B) is a view which illustrates a state where both the first contact roller 22 and the second contact roller 23 reach a predetermined quantity of contact w, causing the relative distance between the proximity switch 29 and the dog 30 to become A0−δ1. As a result, a burr detection signal (ON signal) is transmitted by the proximity switch 29. The transmission of the burr detection signal takes place when the first contact roller 22 going ahead to the second contact roller 23 in the circumferential direction of the pipe 11 is brought into contact with the burrs 13A under conditions that both the first contact roller 22 and the second contact roller 23 are positioned in contact with the thickness-increased tapered portion 13.

Figure 8C:
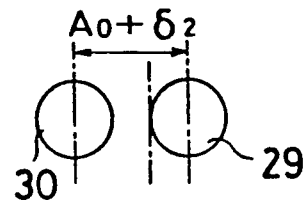

FIG. 8(C) is a view which illustrates a state the relative distance between the proximate switch 29 and the dog becomes A0+δ2 when the second contact roller 23 going ahead to the first contact roller 22 in the circumferential direction of the pipe 11 is brought into contact with the burrs 13A under conditions that both the first contact roller 22 and the second contact roller 23 are positioned in contact with the thickness-increased tapered portion 13 after the state shown in FIG. 8(B).

The determining device 24 comprises, for example, a microcomputer including a CPU (Central Processing Unit) 31, a ROM (Read Only Memory), a RAM (Random Access Memory) 33, and an I/O device 34. The detection signal detected by the proximity switch 29 is supplied to the determining device 24. Furthermore, the above-described predetermined amount w of detected contact with burrs and taper angle θ of the thickness-increased tapered portion 13 which is determined by the type of the mold are previously supplied by b setter 35 of the main operation panel 103 are supplied to the same. In addition, both present position 1 in the axial direction and position α in the circumferential direction of the pipe 11 with which the first contact roller 22 and the second contact roller 23 are positioned in contact are also supplied from a pipe position detector 36 to the determining device 24. Thus, the first contact roller 22 moves on the burrs 13A during the forward movement of the positions of contact from the thickness-increased straight portion 12 toward the thickness-increased tapered portion 13. As a result the determining device 24 determines the rotational angular position α0 of the pipe 11 as the position of the burrs 13A in the circumferntial direction in the thickness-increased tapered portion 13, the rotational angular position α0 being the degree when the amount of the relative movement of the two contact rollers 22 and 23 reaches a predetermined amount w of detected contact with burrs.

The determining device 24 determines taper start position 10 in the thickness-increased portion 13 in accordance with the axial position 1 of the pipe 11 when the amount of the relative movement of the two contact rollers 22 and 23 reaches a predetermined amount w of detected contact with burrs, taper angle θ of the thickness-increased tapered portion 13 which has been previously determined at upset forging, and the above-described amount w of detected contact with burrs, the determining device 24 determining it by using the following Equation (1):

$$l0 = l - x = l - w/\tan\theta \tag{1}$$

The thus-obtained α0 and 10 are transmitted to the main control unit 100 so that α0 and 10 are used as data for controlling the operation of the deburring robot 40 and are also used as data for controlling the operation of a loading device 18 which is capable of positioning the pipe 11 with respect to the deburring robot 40.

Figure 4:
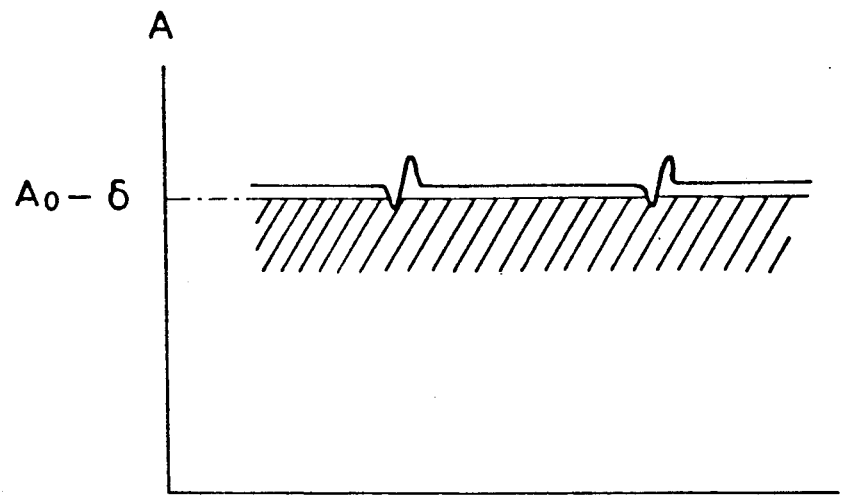
FIG. 4 is a graph which illustrates the state of a detecting operation.
Figure 5:
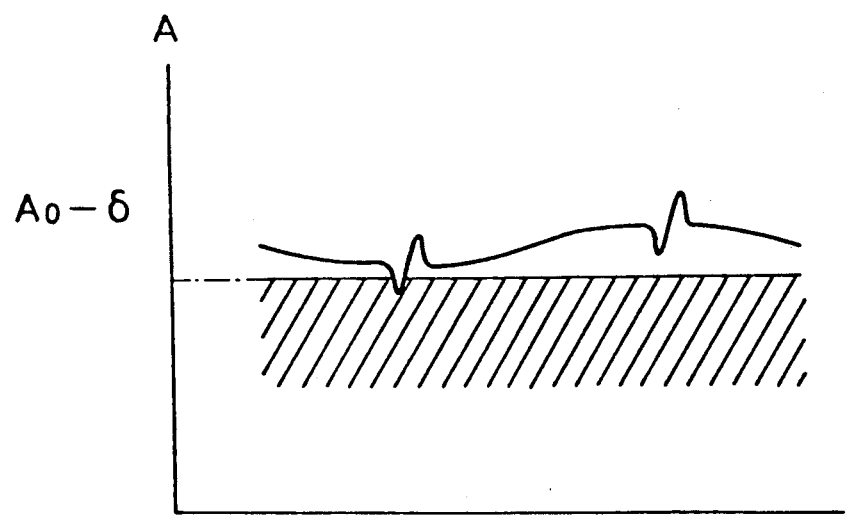
FIG. 5 is a graph which illustrates the state of another detecting operation.

FIGS. 4 and 5 are graphs which illustrate change in relative distance A between the proximity switch 29 and the dog 30 of the above-described burr position detection device 20 during both the first contact roller 22 and the second contact roller 22 are positioned in contact with the thickness-increased tapered portion 13.

FIG. 4 is a graph which shows the results of the measurement of the pipe 11 in the case where it has a slight warp therein. When the proximity switch 29 and dog 30 come close to the hatched section in the drawing, the proximity switch 29 transmits a burr detection signal (ON signal) and the determining device 24 determines the burr position (α0) and the taper start position (10).

FIG. 5 is a graph which shows the results of the measurement of the pipe 11 in the case where it has a certain warp. In this case, the amount of the relative movement of the two contact rollers 22 and 23 due to the warp of the end of the pipe 11 is cancelled. Alternatively, the positions of the burrs 13A in either of the two places in the circumferential direction of the pipe 11 are detected. Furthermore, the positions of the burrs 13A which make an angle of 180° with respect to the former burrs can also be detected. In this case, the taper start position can be detected in the similar way.

Figure 10:
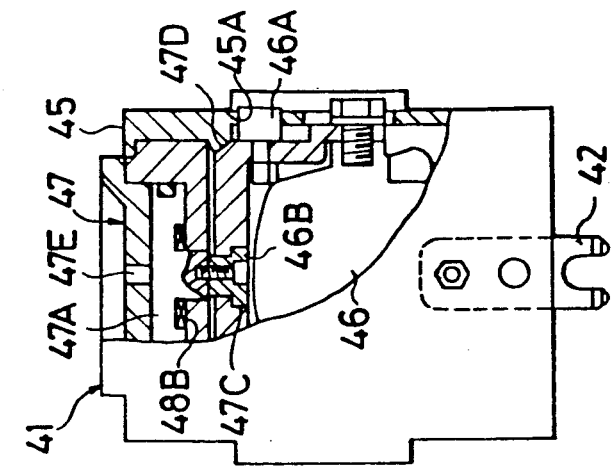
FIG. 10 is a front elevational view of FIG. 9.
Figure 9:
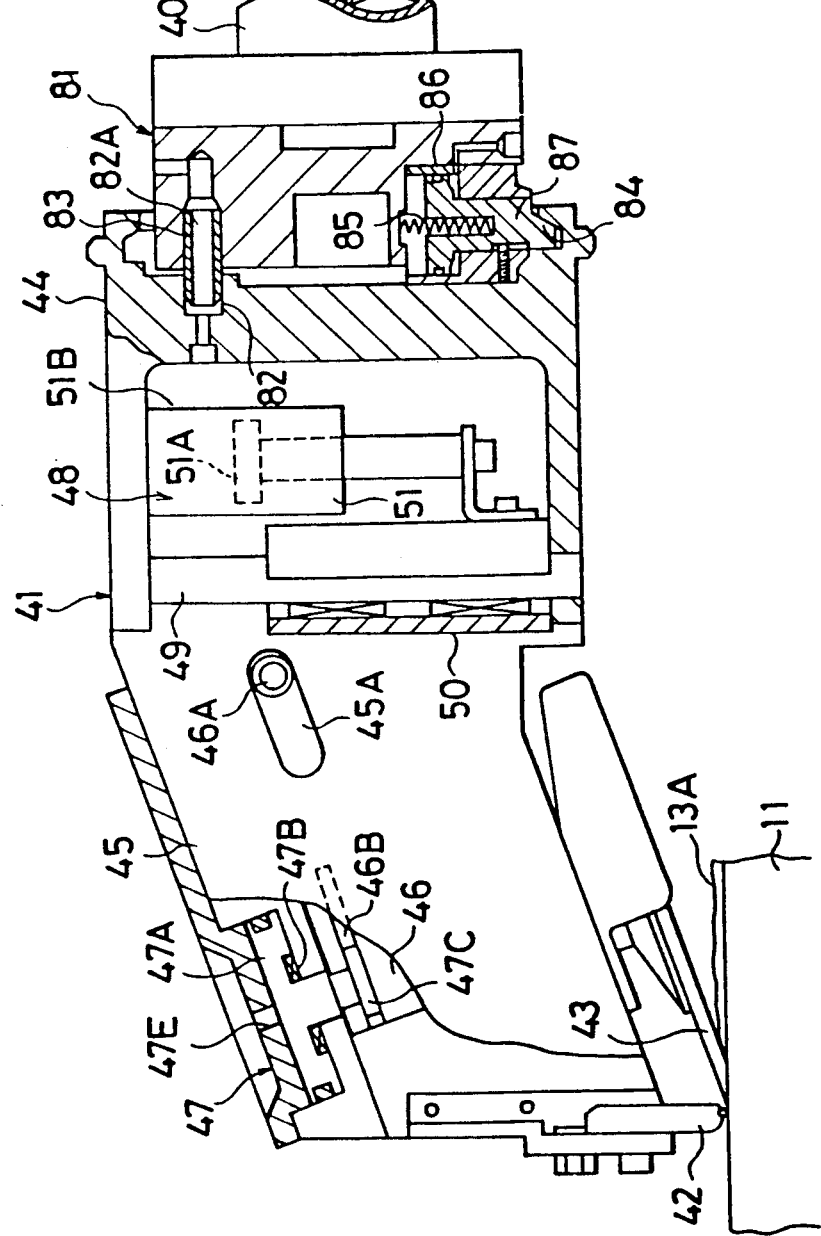
FIG. 9 is a partially broken side elevational view which illustrates a deburring grinder.

The deburring robot 40 comprises, as shown in FIGS. 1, 9, and 10, a base body 40A having an articulated movable arm 40B, the movable arm 40B having the above-described deburring grinder 41 at the front portion thereof. The deburring grinder 41 comprises a stationary frame 44 secured to the movable arm 40B, a copying frame 45 which is so coupled to the stationary frame 44 as to be capable of moving in the direction of grinding by the whetstone and which comprises the copying claw 42 which is capable of copying the surface of the pipe 11, a whetstone frame 46 which is slidably disposed in the direction in which the whetstone 43 is worn and comprises the whetstone 43, and a clamping device 47 disposed between the copying frame 45 and the whetstone frame 46 and capable of clamping the whetstone frame 46 to the copying frame 45.

Referring to FIGS. 9 and 10, reference numerals 45A represents a slide groove formed in the copying frame 45, and 46A represents a slide roller disposed on the whetstone frame 46. Reference numeral 47A represents a clamp piston disposed in the copying frame 45, 47B represents an elastic spring of the clamp piston 47A, 47C represents a pressing member coupled with the clamp piston 47A, 46B represents a fastening groove to which the pressing member 47C is fitted.

Thus, the clamping device 47 realizes the following functions:

① The clamp piston 47A and the pressing member 47C are raised by the elastic force of the elastic spring 47B so that a locking surface 47D between the copying frame 45 and the whetstone frame 46 is locked with pressure.

② The thus established locking surface 47D with pressure is released by lowering the clamp piston 47A and the pressing member 47C by air supplied through an air supply port 47E.

As shown in FIG. 9, an equalizing device 48 is disposed between the stationary frame 44 and the copying frame 45, the equalizing device 48 being capable of pressing the copying frame 45 in the grinding direction of the whetstone 43 with respect to the stationary frame 44.

The equalizing device 48 is structured in such a manner that a guide cylinder 50 secured to the copying frame 45 is axially movably coupled with respect to a guide rod 49 secured to the stationary frame 44 and an air cylinder 51 capable of generating air spring force is disposed between the stationary frame 44 and the copying frame 45. A piston 51A of the air cylinder 51 is arranged to be positioned in the axially intermediate position of the cylinder 51B during the deburring operation with the whetstone 43 so that it can move in both upward and downward axial directions with corresponding to the warp of the shape of the pipe 11.

That is, the effects of the presence of the copying claw 42 and the equalizing device 48 in the deburring robot 40 are as follows:

① When the shape of the pipe 11 is complicated or irregularly changed or the shapes of the burrs 13 are not uniform, the whetstone 43 can be caused to correspond to the above shape of burrs so that the pipe 11 can be protected from being bitten by the burrs or failure to remove burrs can be overcome.

② The pressure of the whetstone 43 to be applied to the burrs can be adjusted during the deburring work. In addition, a proper grinding can be so performed as to corresponds to variations in size of the burrs 13A. As a result, the burrs on the pipe 11 can be reliably removed.

As shown in FIGS. 11 and 12, the whetstone wear compensating device 60 comprises a base block 61 with which the copying claw 42 of the copying frame 45 of the deburring grinder 41 is brought into contact, a detection element 62 with which the whetstone 43 of the whetstone frame 46 is brought into contact, and a detection sensor (for example, a proximity switch) 63 capable of detecting a fact that the detection element 62 is positioned at the end of a stroke through which the detection element 62 is pushed (that is, a specific position) with respect to the base block 61.

The whetstone wear compensating device 60 is arranged in such a manner that the whetstone frame 46 is enabled to slide with its dead weight with respect to the frame 45 under conditions that the copying claw 42 of the copying frame 45 is positioned in contact with the base block 61, the whetstone frame 46 being in a state after it has been released from the clamping effect caused by the clamping device 47. Furthermore, the whetstone 43 of the whetstone frame 46 is brought into contact with the detection element 62. Then, the clamping device 47 is clamped if the fact that the detection element 62 is positioned at a predetermined position (for example, relative interval g) with respect to the base block 61 is detected by the detection sensor 63. As a result, the whetstone 43 is positioned at a predetermined position with respect to the copying claw 42 which is positioned in contact with the base block 61. The whetstone wear compensating operation by the whetstone wear compensating device 60 is performed when the whetstone 43 of the deburring grinder 41 reaches the above-described predetermined moment of usage of whetstone 43 by way of branching the control program stored in the main control unit 100 from the deburring program to an wear compensating program and by so shifting the grinder 41 of the deburring robot 40 as to confront the whetstone wear compensating device 60.

That is, in the whetstone wear compensating device 60, the whetstone 43 can be positioned with a predetermined constant positional relationship kept with respect to the copying claw 42 since the whetstone frame 46 of the deburring grinder 41 is arranged to be movable with respect to the copying frame 45 and is also arranged to be able to be clamped. That is, the periodical compensation of wear of the whetstone 43 can be reliably and readily conducted. Furthermore, the positional relationship between the whetstone 43 and the copying claw 42 can be modified to restore the predetermined relationship. Therefore, the whetstone 43 so moves relatively to the pipe 11 as to trace the shape of the pipe 11 via the copying claw 42 during the copying operation of the copying claw 42 along the pipe 11. Therefore, reliable deburring effect can be obtained. Furthermore, a fact that the whetstone 43 can be no longer positioned at the predetermined position with respect to the copying claw 42 is able to be determined by the detection sensor 63 of the whetstone wear compensating device 60. Therefore, life of the whetstone 43, that is, the moment at which the same must be exchanged can be determined.

The whetstone renewing device 80 is structured as shown in FIG. 9 that a chucking device 81 is provided for the movable arm 40B of the deburring robot 40, the chucking device 81 being capable of attaching and detaching the deburring grinder 41. The chucking device 81 comprises: a cylindrical guide pin 83 to be fitted within a positioning hole 82 formed in the stationary frame 44 of the grinder 41 and capable of being also used as an air supply passage 82A through which air is supplied to the grinder 41; and a chuck claw 87 which is arranged to be engaged to a faucet joint 84 formed in the stationary frame 44 of the grinder 41 by means of an elastic member 85 and to be disengaged by the air cylinder device 86.

As a result, the whetstone renewing device 80 so shifts the grinder 41 of the deburring robot 40 as to confront a tool stand 88 under conditions that wear of the whetstone 43 reaches the limit at which the compensation cannot be effected. This leads to a fact that the grinder 41 which has been used is unchucked and is returned to an empty station. Then, a new grinder 41 to which a new whetstone 43 is loaded is chucked.

That is, the whetstone renewing device 80 exhibits excellent accuracy in positioning the grinder 41 since the guide pin 83 is provided for the chucking device 81. Furthermore, since the guide pin 83 is also used as the air supply passage 82A, the grinder 41 can be connected to the guide pin 83 and it can be connected to the air supply source. Therefore, in the deburring apparatus 10 which frequently and alternately uses variable whetstones 43, the whetstone 43 thereof can be reliably and readily renewed without deterioration in the operation rate when the whetstone reaches it wear limit or a new whetstone 43 is used so as to corresponds to change in the type of the pipe 11. At this renewal, only the whetstone 43 may be exchanged as an alternative to change of the overall body of the deburring grinder 41.

Figure 13:
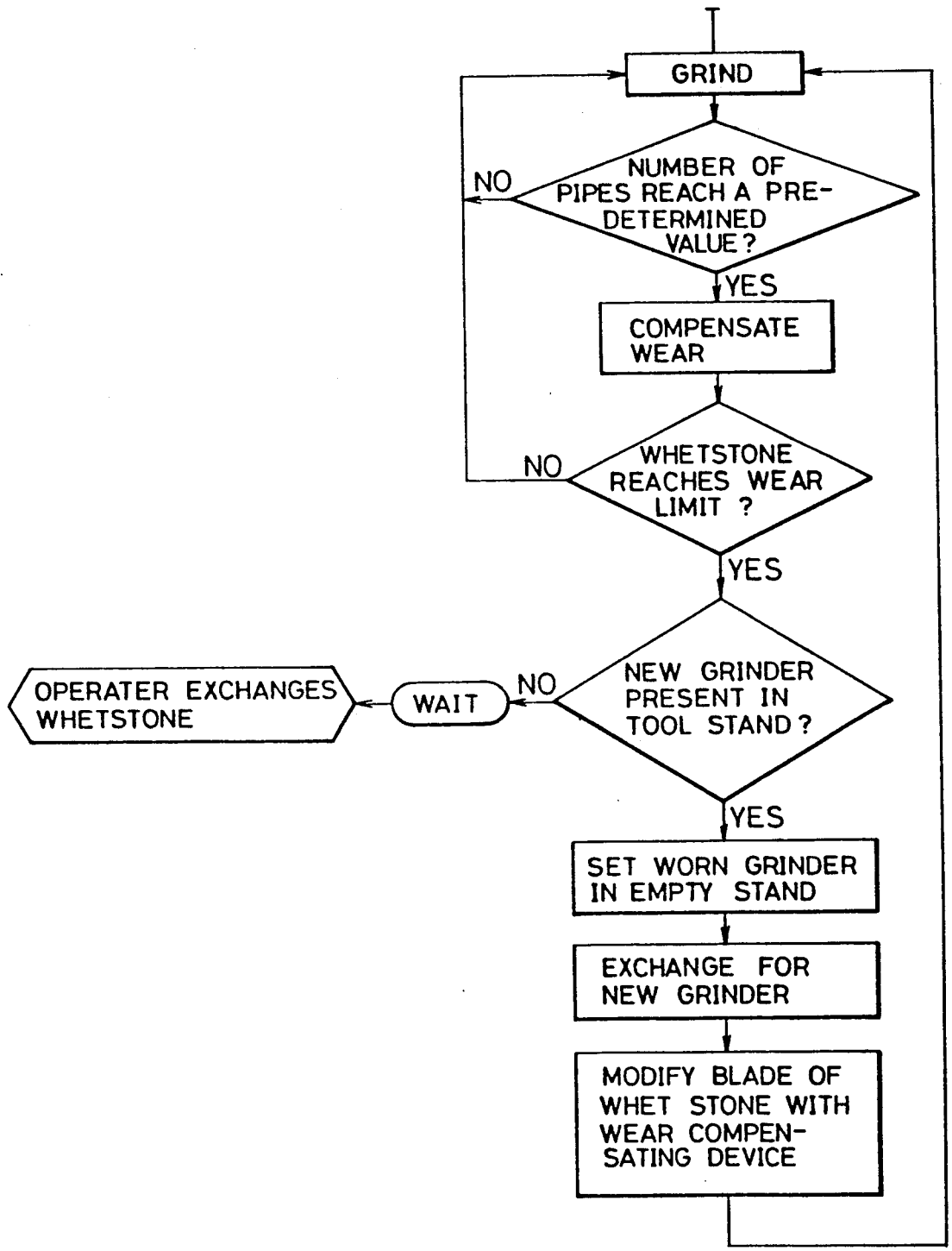
FIG. 13 is a flow chart which illustrates the process for compensating the worn whetstone and renewing the same.
Figure 16:
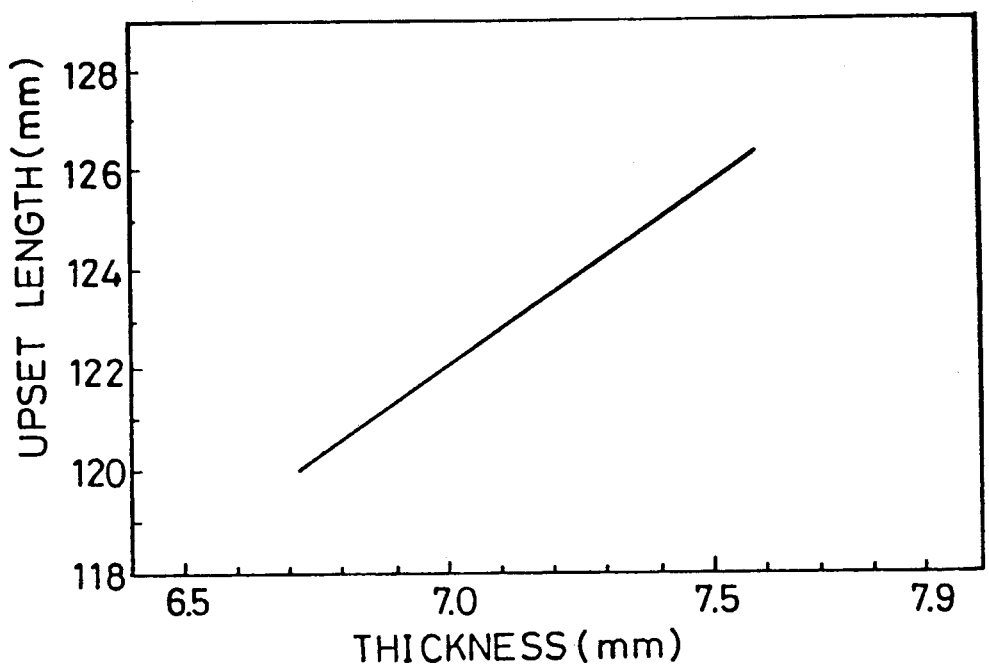
FIG. 16 is a diagram which illustrates the relationship between the wall thickness of the pipe and the upset length.
Figure 17:
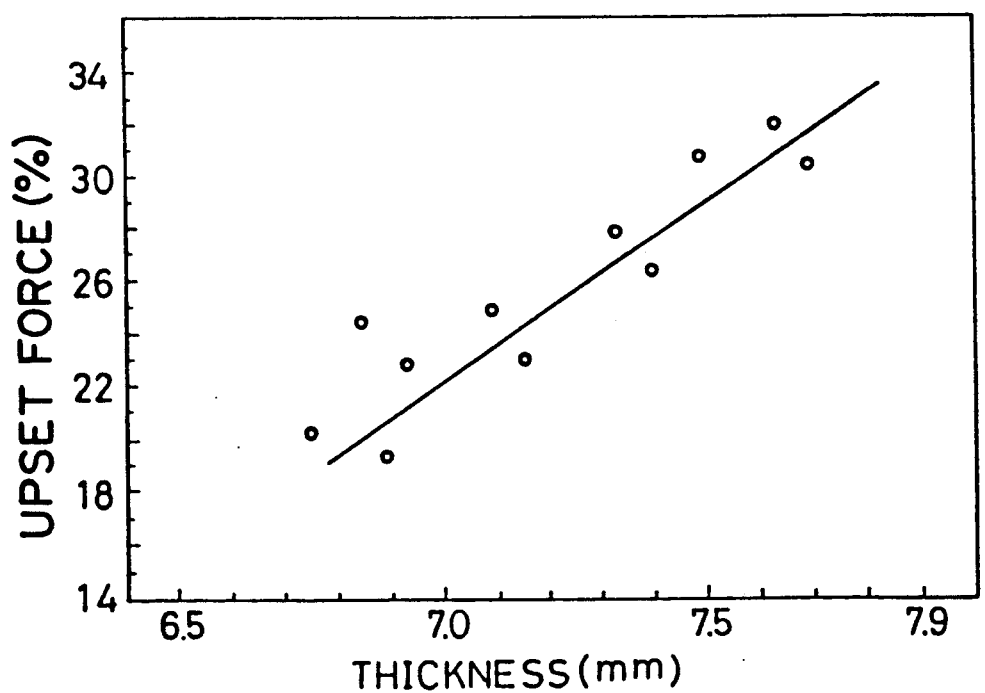
FIG. 17 is a diagram which illustrates the relationship between the wall thickness of the pipe and the upsetting force.

FIG. 13 is a flow chart which illustrates the process of compensating the wear of the whetstone and the renewal of the same by the whetstone wear compensating device 60 and the whetstone renewing device 80.

Furthermore, the grinding conditions by means of the grinder (the number of grindings to be performed, grinding speed, and pressure of the whetstone to be applied to the material) may be automatically adjusted in accordance with the height of burrs by way of detecting the height of the burrs by the burr position detection device.

INDUSTRIAL FIELD OF THE INVENTION

As described above, according to an aspect of the invention described in claim 1, burrs formed on a workpiece can always be reliably removed without manual labor.

According to a second aspect of the invention described in claim 2, even if the shape of the workpiece is complicated or changed irregularly or the shape of burrs is nonuniform, burrs formed on the workpiece can be reliably removed.

According to a third aspect of the invention described in claim 2, the positional relationship between the copying claw and the whetstone can be properly modified so as to improve accuracy in the deburring operation.

According to a fourth aspect of the invention described in claim 3, the whetstone can be readily renewed without deterioration in the operation rate of the apparatus.

According to a fifth aspect of the invention described in claim 4, the positions of burrs on the surface of pipes of variable sizes and the upset shapes can be reliably removed even if the upset shape or the shape of the burrs are varied due to change in the size of the pipe.

What is claimed is:

1. A deburring apparatus for removing burrs on a workpiece, comprising a deburring robot, a deburring grinder mounted on said robot, said grinder having a rotating whetstone, means controlled by the robot for moving said whetstone to contact said burrs, compensating means on said robot for sensing wear on said whetstone and changing the position of said whetstone with respect to the workpiece, and whetstone renewing means for detecting a worn-down whetstone and replacing it with a new whetstone, including a stationary frame supporting a movable arm of said deburring robot, a copying frame supporting said whetstone and movably coupled to said stationary frame for movement in the direction of the workpiece, a copying claw supported on said copying frame and adapted to copy the surface of said workpiece, and an equalizing device disposed between said stationary frame and said copying frame for pressing said copying frame toward said stationary frame in the direction of said workpiece.

2. A deburring apparatus according to claim 1, including a stationary frame, a copying frame coupled to said stationary frame for movement in the direction of said workpiece, a copying claw on said copying frame for copying the shape of said workpiece, a whetstone frame supporting said whetstone and disposed to said copying frame and slidably movable in the direction in which said whetstone wears down; and a clamping device disposed between said copying frame and said whetstone frame for clamping said whetstone frame to said copying frame, a whetstone wear compensating device comprises a base block in contact with said copying claw and said copying frame, a detection element for contacting said whetstone on said whetstone frame, and a detection sensor for detecting the position of said detection element with respect to said base block, a wear compensating system for supporting said whetstone frame for slidable movement owing to its dead weight with respect to said copying frame for moving said copying claw on said copying frame into contact with said base block and bringing said whetstone into contact with said detection element, and means for positioning said detection element at a specified position with respect to said base block as detected by said detection sensor, said whetstone being positioned at a predetermined position with respect to said copying claw.

3. A deburring apparatus according to claim 1, wherein said whetstone renewing device comprises a chucking device for attaching and detaching said deburring grinder to a movable arm of said deburring robot, said chucking device comprising a cylindrical guide pin fitted within a positioning hole formed in said stationary frame of said grinder and serving as an air supply passage through which air can be supplied to said grinder, and a chucking claw engageable with a faucet joint formed in said stationary frame of said grinder by an elastic member and disengageable by an air cylinder device.

4. A deburring apparatus for removing burrs on a surface of an upset pipe having a thickness which has been increased by upset forging with a punch inserted into an end portion of said upset pipe positioned in a pair of half molds, said deburring apparatus comprising: a burr position detection device for detecting the position of burrs on the surface of said upset pipe, a deburring robot including a deburring grinder having a copying claw for copying the surface of said upset pipe, a whetstone rotatably supported on said grinder and being disposed at a predetermined position with respect to said copying claw, a whetstone wear compensating device for adjusting the position of said whetstone with respect to said copying claw and for compensating the amount of wear on said whetstone, a renewing device for exchanging said deburring grinder on said deburring robot, a main control unit for controlling the grinding operation, a memory device, and an I/O device, said main control unti controls the operation of said deburring grinder and said whetstone wear compensating device, and means in said main control unit, after said whetstone reaches a predetermined moment of usage, for exchanging said deburring grinder or only its whetstone.

* * * * *